US012594933B2

(12) United States Patent
Stein et al.

(10) Patent No.: US 12,594,933 B2
(45) Date of Patent: Apr. 7, 2026

(54) METHOD FOR SAFEGUARDING A DANGER ZONE

(71) Applicant: Daimler Truck AG, Leinfelden-Echterdingen (DE)

(72) Inventors: Fridtjof Stein, Ostfildern (DE); Tobias Schwalb, Leinfelden-Echterdingen (DE); Marcus Liebhardt, Waiblingen (DE); Wolfgang Kob, Waiblingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 131 days.

(21) Appl. No.: 18/547,973

(22) PCT Filed: Feb. 25, 2022

(86) PCT No.: PCT/EP2022/054774
§ 371 (c)(1),
(2) Date: Aug. 25, 2023

(87) PCT Pub. No.: WO2022/180206
PCT Pub. Date: Sep. 1, 2022

(65) Prior Publication Data
US 2024/0166202 A1 May 23, 2024

(30) Foreign Application Priority Data
Feb. 26, 2021 (DE) ..................... 10 2021 001 035.3

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/146* (2013.01);
(Continued)

(58) Field of Classification Search
CPC ............. B60W 30/09; B60W 60/0018; B60W 30/0956; B60W 30/146; B60W 30/182; B60W 2556/45; G08G 1/164; G08G 1/166
See application file for complete search history.

(56) References Cited

U.S. PATENT DOCUMENTS 10,564,638 B1 * 2/2020 Lockwood ........... G05D 1/0027
2019/0329774 A1 10/2019 Hilnbrand et al.
(Continued)

FOREIGN PATENT DOCUMENTS

CN 110246370 A 9/2019
CN 110398952 A 11/2019
(Continued)

OTHER PUBLICATIONS

PCT/EP2022/054774, International Search Report dated Jun. 13, 2022 (Two (2) pages).
(Continued)

*Primary Examiner* — Wade Miles
*Assistant Examiner* — Jerrod Irvin Davis
(74) *Attorney, Agent, or Firm* — Crowell & Moring LLP

(57) ABSTRACT

A method for safeguarding a self-driving, damaged vehicle includes independently detecting damage of the damaged vehicle by the damaged vehicle and sending information concerning the damage to a central computing unit, connected with the damaged vehicle, of an operator of the damaged vehicle by the damaged vehicle. Information concerning the damage of the vehicle is sent to a superior authority by the central computing unit. A further central computing unit of an operator of a self-driving further vehicle located near the damaged vehicle is informed about the damaged vehicle by the superior authority. When the further vehicle is moving towards the damaged vehicle, the (Continued)

further vehicle is put into a safeguarding mode by the further central computing unit.

3 Claims, 4 Drawing Sheets

(51) Int. Cl.
| | |
|---|---|
| *B60W 30/14* | (2006.01) |
| *B60W 30/182* | (2020.01) |
| *B60W 60/00* | (2020.01) |
| *G08G 1/16* | (2006.01) |

(52) U.S. Cl.
CPC ...... *B60W 30/182* (2013.01); *B60W 60/0018* (2020.02); *G08G 1/164* (2013.01); *G08G 1/166* (2013.01); *B60W 2556/45* (2020.02)

(56) References Cited

U.S. PATENT DOCUMENTS

| | | | |
|---|---|---|---|
| 2019/0333392 A1* | 10/2019 | Schwensfeier | .. G08G 1/096844 |
| 2019/0340845 A1 | 11/2019 | Sternecker | |

| | | | |
|---|---|---|---|
| 2022/0365530 A1* | 11/2022 | Foster ............... | B60W 60/0015 |
| 2023/0138112 A1* | 5/2023 | Gross .................. | G05D 1/0038 |
| | | | 701/24 |

FOREIGN PATENT DOCUMENTS

| | | | |
|---|---|---|---|
| CN | 110660269 A | 1/2020 | |
| DE | 10 2015 215 766 A1 | 2/2017 | |
| DE | 10 2016 006 687 A1 | 11/2017 | |
| DE | 10 2017 205 255 A1 | 10/2018 | |
| DE | 10 2018 115 556 A1 | 11/2019 | |
| KR | 10-2018-0087902 A | 8/2018 | |
| WO | WO 2019/224316 A1 | 11/2019 | |

OTHER PUBLICATIONS

Chinese-language Office Action issued in Chinese Application No. 202280017310.7 dated Jan. 30, 2026 with partial English translation (11 pages).

* cited by examiner

METHOD FOR SAFEGUARDING A DANGER ZONE

BACKGROUND AND SUMMARY OF THE INVENTION

The invention relates to a method for safeguarding a self-driving, damaged vehicle. The invention further relates to a device for carrying out such a method.

A method for safeguarding a danger zone and for warning road users in the surroundings of the danger zone by means of at least one first automated vehicle is known from DE 10 2018 115 556 A1. Here, the danger zone is identified by the at least one first automated vehicle. A situation-dependent stopping trajectory is determined in the surroundings of the danger zone and/or the first automated vehicle is controlled to navigate the stopping trajectory by at least one control unit of the at least one first automated vehicle or an external control unit. Other road users are warned about the danger zone by the at least one first automated vehicle by means of visual warning signals.

The object of the invention is to provide a method and a device for safeguarding a danger zone formed by a self-driving, damaged vehicle.

According to the invention, a method for safeguarding a self-driving, damaged vehicle provides that the damaged vehicle independently detects its damage and information concerning the damage is sent to a central computing unit, connected with the vehicle, of an operator of the vehicle by means of the vehicle. By means of the central computing unit, information concerning the damage of the vehicle is sent to a superior authority, which informs a further central computing unit of at least one operator of a self-driving further vehicle located near the damaged vehicle about the damaged vehicle. By means of the further central computing unit, if the self-driving further vehicle is moving towards the damaged vehicle, it is put into a safeguarding mode.

By using the method, safety, in particular on a section of road on which the damaged vehicle is located, can be increased, since the risk of a resulting accident involving the damaged vehicle and other road users is significantly reduced.

If the self-driving vehicle is damaged, the method results in a cooperative behavior of the self-driving further vehicle by safeguarding a danger zone that has been caused by the damaged vehicle.

Exemplary embodiments of the invention are illustrated in greater detail below by means of drawings.

DETAILED DESCRIPTION OF THE DRAWINGS

Figure 1:
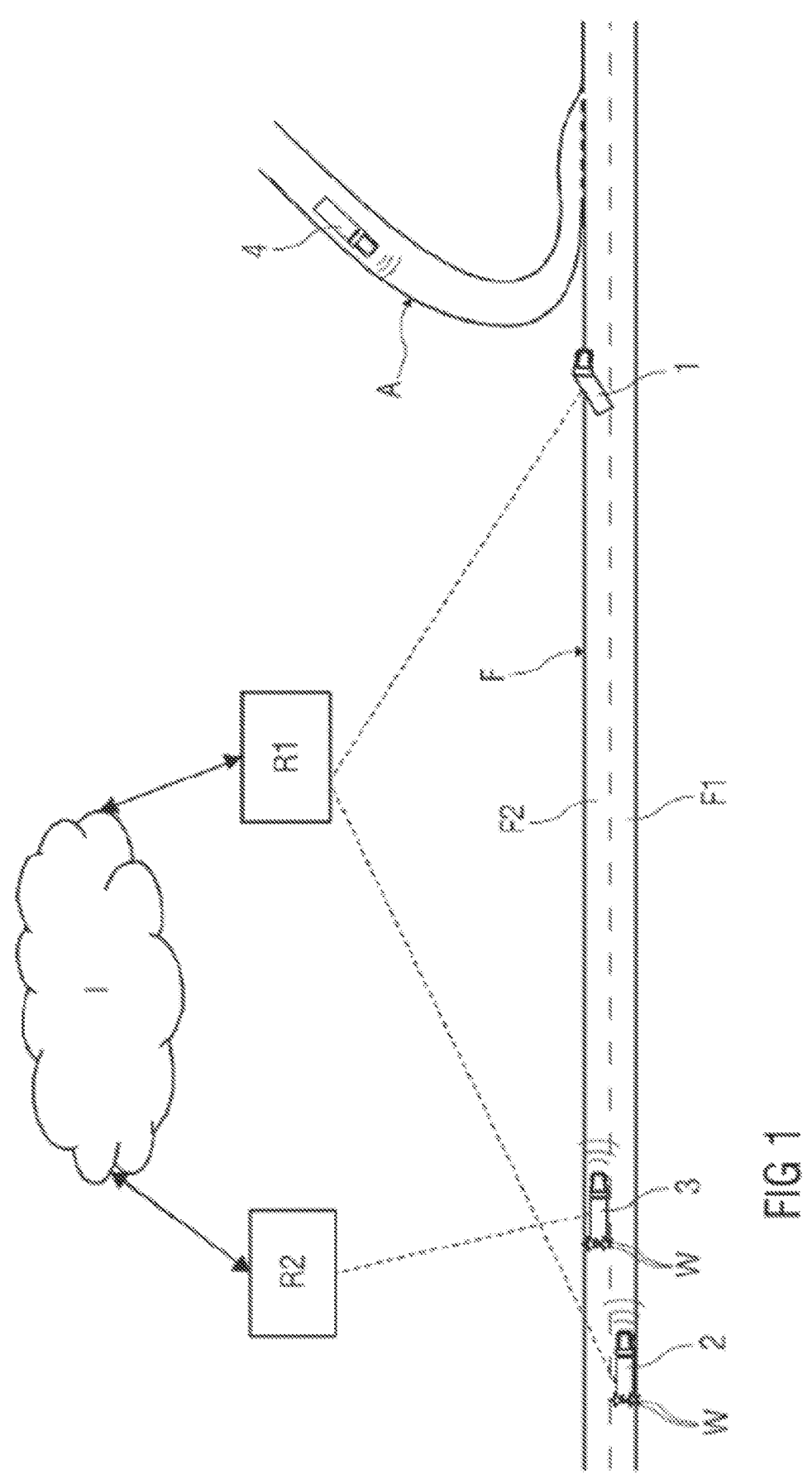
FIG. 1 schematically shows a section of road with a self-driving, damaged vehicle and further vehicles.

Parts that correspond to one another are provided with the same reference characters in all figures.

In FIG. 1, a section of road F, for example of a motorway, with two lanes F1, F2 running in the same direction is represented, wherein a self-driving, damaged vehicle 1 is located on the section of road F and blocks both lanes F1, F2.

Self-driving further vehicles 2, 3 are approaching the damaged vehicle 1 on both lanes F1, F2. Another vehicle 4 is located on a slip road A to the section of road F, wherein the slip road A joins the section of road F after the broken-down damaged vehicle 1 in the direction of travel.

All the vehicles 1 to 4 shown in the exemplary embodiment according to FIG. 1 are lorries and therefore comprise a towing vehicle as well as a semi-trailer or a trailer. Alternatively to this, they can be self-driving passenger cars, buses or similar.

The damaged vehicle 1 and a first further vehicle 2 belong to an operator, in particular to a logistics company, wherein these two vehicles 1, 2 are connected with one and the same central computing unit R1.

A second, further vehicle 3 is assigned to another operator and is connected with a further central computing unit R2.

The central computing unit R1 and the further central computing unit R2 are, in turn, connected with a superior authority I, for example a service provider.

For example, the vehicle 1 has broken down due to a technical failure of the comparatively complexly designed towing vehicle or the vehicle 1 has been involved in an accident.

The vehicle 1 has a communication unit K via which the vehicle 1 is connected with the central computing unit R1, so that in such a situation, help is requested from the central computing unit R1 by the damaged vehicle 1.

A comparatively long period of time can, however, pass until this help arrives, during which the damaged vehicle 1 represents a danger for other road users. For example, there is the danger that the vehicle 1, as is shown in FIG. 1, blocks the lanes F1, F2, even if only partially and, for example, a hazard can arise from a load of the vehicle 1, in particular if this is hazardous goods, and/or there is the danger of fire, for example, because an electrical energy store of the vehicle 1 has caught on fire.

In order to significantly reduce the risk of a hazard to other road users in such a case, a method described in the following is provided.

If the vehicle 1 has broken down, it detects its damage itself and connects itself with the central computing unit R1, whereby the latter is sent information concerning the damage. In particular, the reason for the damage as well as a position of the vehicle 1 are shared with the central computing unit R1.

The central computing unit R1 subsequently sends information concerning the damage of the vehicle 1 to the superior authority I, which, in turn, sends corresponding information to the further central computing unit R2, in order to inform all self-driving further vehicles 2, 3 that are approaching the damaged vehicle 1 on the section of road F about this. The risk of a collision with the damaged vehicle 1 can therefore, for example, be at least significantly reduced.

Here, in addition to a typical transfer of information to manned vehicles by means of radio and/or by means of certain subscribed information channels, sending the information concerning the damage of the vehicle 1 takes place in particular in the form of application programs, so-called apps.

If the further vehicles 2, 3 approaching the damaged vehicle 1 have received the information about the broken-down damaged vehicle 1 on the section of road F ahead from their respective central computing unit R1, R2, then the further vehicles 2, 3 are put into a situation-dependent safeguarding mode.

The other vehicle 4 located on the slip road A may also receive the information about the damaged vehicle 1, wherein the other vehicle 4, since it is not approaching the damaged vehicle 1, is not put into the safeguarding mode.

In relation to the safeguarding mode, there are different situation-dependent behavior modes, whereby the further vehicles 2, 3 approaching the damaged vehicle 1 reduce their current driving speed and give out corresponding signals on the outside of the respective vehicle 2, 3. In particular, the self-driving further vehicles 2, 3 activate their hazard warning lights W.

If the damaged vehicle 1 is burning, then the further vehicles 2, 3 approaching the vehicle 1 respectively reduce their current driving speed in the safeguarding mode and block a travel path in the direction of travel, in particular in the direction of the burning vehicle 1, with flashing signals being given out, in particular by means of the hazard warning light W.

If the damaged vehicle 1 blocks the lanes F1, F2, as is shown in FIG. 1, then the approaching further vehicles 2, 3 also reduce their driving speed and block the travel path in the direction of the damaged vehicle 1, whereby the hazard warning light W, for example only on the rear side, is activated.

Figures 2, 3:
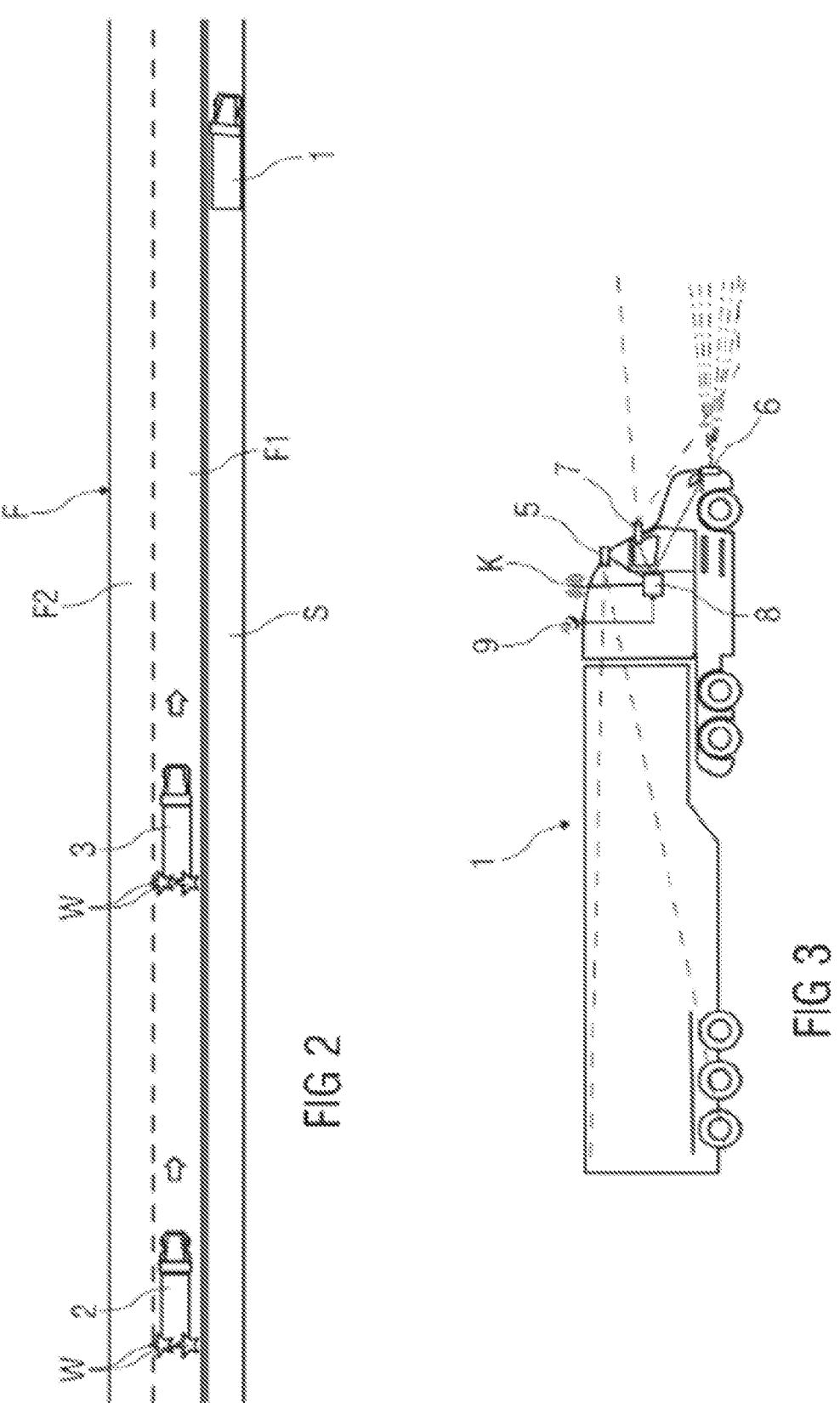
FIG. 2 schematically shows the damaged vehicle stood on a hard shoulder and further vehicles driving past.
FIG. 3 schematically shows the damaged vehicle with an environment sensor system and a communication unit as well as a central computing unit.

If the damaged vehicle 1 is on a hard shoulder S of the section of road F, the further vehicles 2, 3 pass the damaged vehicle 1 with reduced driving speed, optionally with activated hazard warning lights, as is shown in FIG. 2.

In particular, a current traffic situation on the section of road F is determined, whereby it is detected whether little traffic, heavy traffic, slow traffic, stop-and-go traffic or a traffic jam prevails.

The damaged vehicle 1 sends information about the current traffic situation in relation to the last kilometre before the damage to the central computing unit R1. Additionally, the damaged vehicle 1 reports to the central computing unit R1 how a current traffic situation in the region of a danger zone formed by the vehicle 1 is developing in an ongoing manner, provided that the vehicle 1 is capable of doing this.

Both further vehicles 2, 3 also report the conditions prevailing on the section of road F to the corresponding central computing unit R1, R2 of their respective operator. In the respective central computing unit R1, R2, a target speed is then, for example, identified, with which the further vehicles 2, 3 approach the danger zone.

FIG. 3 shows the damaged vehicle 1 with an exemplarily represented environment sensor system.

The environment sensor system has, for example, a rear-facing sensor 5, a front-facing beam sensor 6 and a front-facing image sensor 7.

Detected signals of the environment sensor system are supplied for analysing and processing by an on-board computing unit 8, which is additionally connected with the communication unit K and a position-determining unit 9 of the vehicle 1.

Figure 4:
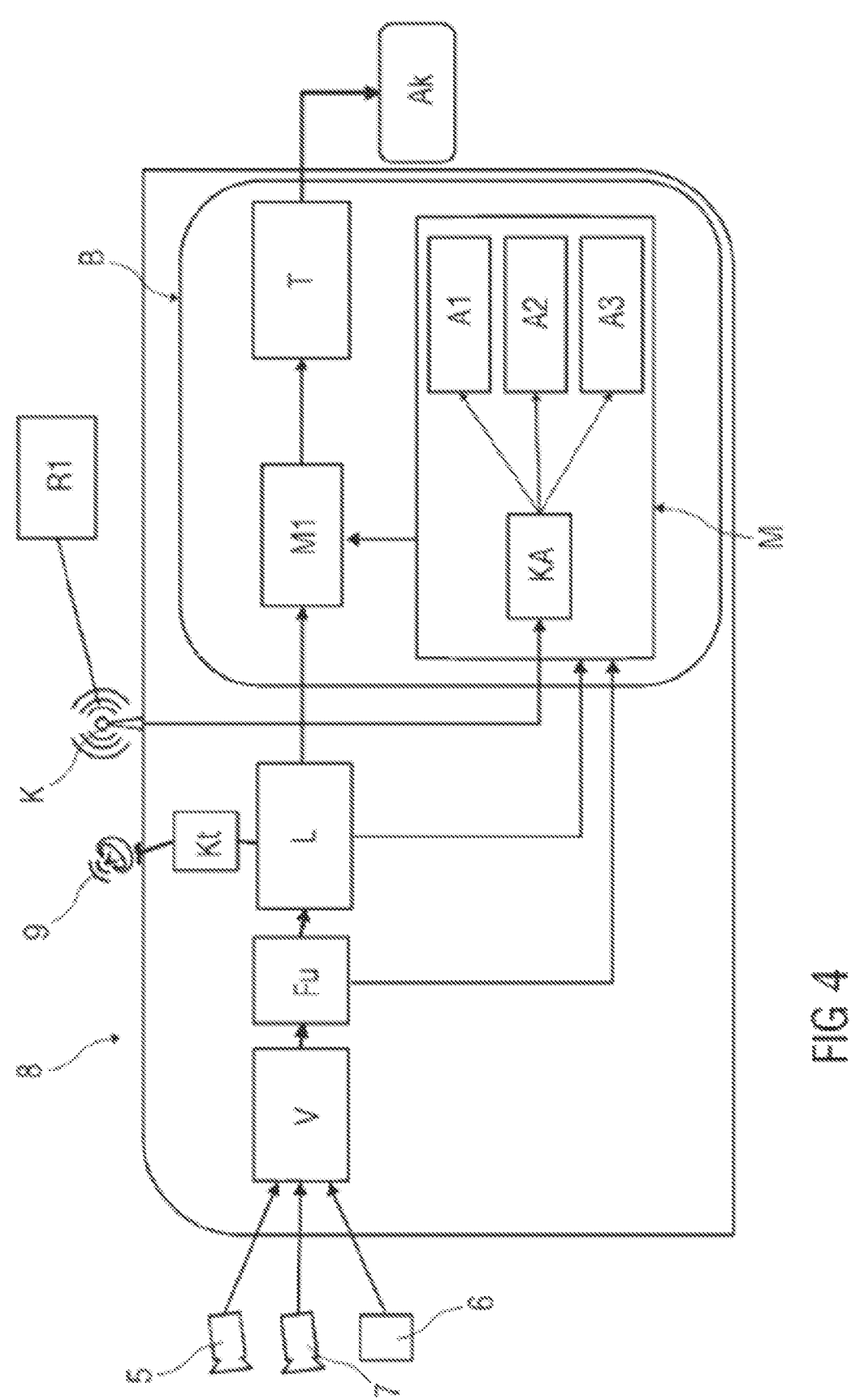
FIG. 4 schematically shows a computing unit of the vehicle with an exemplary method sequence in relation to the damaged vehicle.

The computing unit 8 of the vehicle 1 with an exemplary method sequence in relation to the damaged vehicle 1 is represented in FIG. 4.

The signals detected by means of the environment sensor system, i.e., the signals detected by means of the rear-facing sensor 5, the front-facing beam sensor 6 and the front-facing image sensor 7, are supplied to the computing unit 8.

In the computing unit 8, signal processing V, a fusion Fu, occurs, whereby, based on an internal digital map Kt of the position-determining unit 9 a localization L takes place.

The fused signals as well as a position of the vehicle 1 identified by means of the digital map Kt are supplied to a safeguarding module M. Here, the safeguarding module M is a component of a so-called behavior/planning module B of the computing unit 8.

A communication that occurred with the central computing unit R1 is analysed by means of a communication analysis KA, whereby, in accordance with the damage of the vehicle 1, a procedure A1 for a roadblock, a procedure A2 for a slow drive past and a procedure A3 for hazardous goods are stored.

A respectively identified situation-dependent procedure A1 to A3 is supplied to a module M1 for situation analysis and planning, which is, in turn, connected with a trajectory generator T for identifying a trajectory.

A respectively identified trajectory is then supplied to an actuator Ak of the further vehicles 2, 3, in order to also safeguard the damaged vehicle 1 in accordance with the present damage.

Figure 5:
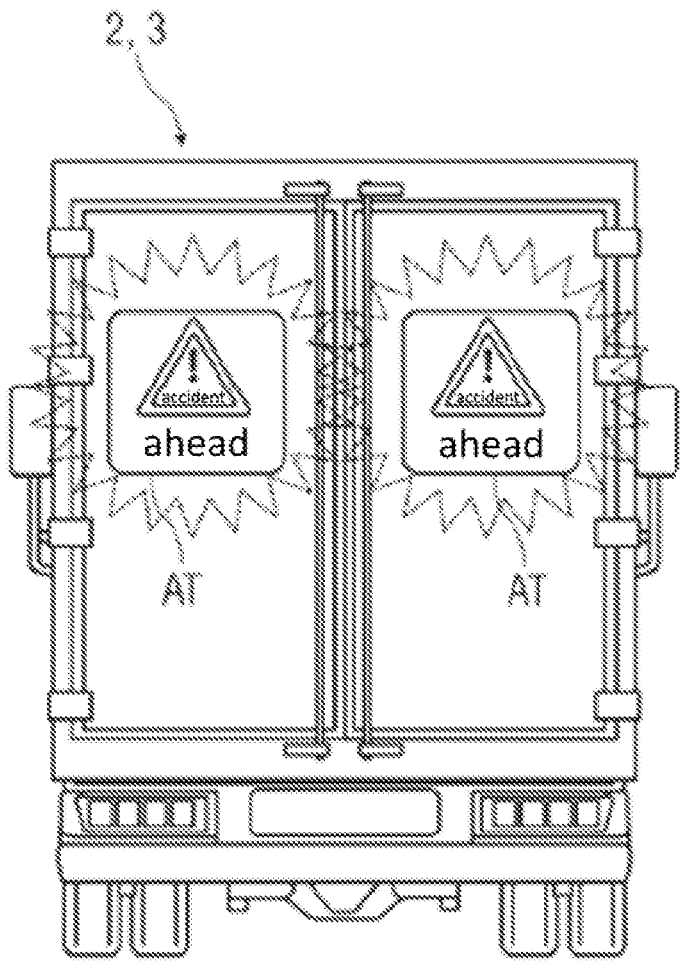
FIG. 5 schematically shows a rear view of a self-driving further vehicle in the safeguarding mode.

In FIG. 5, a rear view of one of the self-driving further vehicles 2, 3 is shown in the safeguarding mode.

Two indicator panels AT are arranged in the rear region of the further vehicles 2, 3, that indicate to following traffic that an accident has taken place on the section of road F ahead.

The following traffic is therefore informed, so that the risk of a resulting accident with the broken-down vehicle 1 can be significantly reduced and the following traffic can potentially use a slip road in order to leave the section of road F.

In a possible embodiment of the method, an operator of the second further vehicle 3 can request a fee from the operator of the damaged vehicle 1 for its safeguarding support. This can, for example, be calculated in accordance with costs incurred for the operator of the second further vehicle 3 due to a delay as a result of the safeguarding.

Once the damaged vehicle 1 no longer represents a danger zone on the section of road F, the safeguarding mode of the further vehicles 2, 3 is ended and deactivated.

The invention claimed is:

1. A method for safeguarding a self-driving, damaged vehicle, comprising the steps of:
   detecting, by the damaged vehicle, that the damaged vehicle has been damaged;
   sending damage information from the damaged vehicle to a first central computing unit that remotely operates the damaged vehicle;
   sending the damage information from the first central computing unit to a superior authority;
   informing a second central computing unit that remotely operates an undamaged vehicle but not the damaged vehicle about the damaged vehicle by the superior authority; and
   putting the undamaged vehicle into a safeguarding mode by the second central computing unit when the undamaged vehicle is moving towards the damaged vehicle.

2. The method according to claim 1, wherein, in the safeguarding mode, depending on a situation caused by the damaged vehicle, a current driving speed of the further vehicle is reduced and a hazard warning light is switched on.

3. A device, comprising:
   a damaged vehicle configured to: independently detect that the damaged vehicle has been damaged, and send damage information to a first central computing unit that operates the damaged vehicle; and a central computing unit configured to:

send the damage information to a superior authority configured to inform a second central computing unit that remotely operates an undamaged vehicle located near the vehicle about the damaged vehicle, and put the undamaged vehicle into a safeguarding mode when the undamaged vehicle is moving towards the damaged vehicle.

\* \* \* \* \*